United States Patent Office 3,674,371
Patented July 4, 1972

3,674,371
TEMPERATURE COMPENSATION OF A LASER INTERFEROMETER
John N. Dukes, Los Altos Hills, Calif., assignor to Hewlett-Packard Company, Palo Alto, Calif.
Filed Apr. 13, 1970, Ser. No. 27,954
Int. Cl. G01b 9/02
U.S. Cl. 356—106                                   2 Claims

ABSTRACT OF THE DISCLOSURE

A laser interferometer is temperature compensated by selecting the distance between the beam splitter and internal reflector, and the distance between the beam splitter and interferometer clamping plane such that each distance changes by the same amount due to changes in the temperature of the interferometer.

BACKGROUND AND SUMMARY OF THE INVENTION

This invention relates to laser interferometers and more specifically to those which are compensated for temperature changes.

An interferometer measures the change in distance between a reference point within the interferometer and a reflector external to the interferometer by counting the number of fringes of an interference pattern caused by the measurement light beam returned by the reflector interfering with an internal reference beam. Both the reference beam and the measurement beam are obtained from the same laser with a beam splitter, and the reflected measurement and reference beams recombine at the beam splitter where they are directed toward a photodetector which counts the interference fringes. If the length the reference beam travels changes, due to a change in the distance between the beam splitter and the internal reference beam reflector, the instrument will register an erroneous distance change, just as if the external reflector had moved. Such distance changes can occur due to changes in the temperature of the instrument, and until the present invention such changes had just been accepted as a source of error in an interferometer. To make highly accurate measurements in the past one had to be sure the interferometer was well warmed-up and in a thermally stable environment.

The preferred embodiment of the present invention compensates for changes in temperature by constructing the mounting structure which holds the beam splitter and the internal reflector such that distance changes in the measurement and reference beams due to temperature changes cancel. To accomplish this compensation, a specific reference plane normal to the measurement beam is established in the interferometer by specifying two clamping points, one on each side of the instrument. Then, once the thermal coefficient of expansion of the mounting structure is known, the distance from the reference plane to the beam splitter and the distance from the beam splitter to the internal reflector can be chosen so the products of the distances and thermal coefficients are equal, resulting in equal path length changes with a change in temperature. Therefore, there is no relative change in distance between the measurement and reference path due to a change in instrument temperature, and thus no measurement error.

DESCRIPTION OF THE PREFERRED EMBODIMENT

Figure 1:
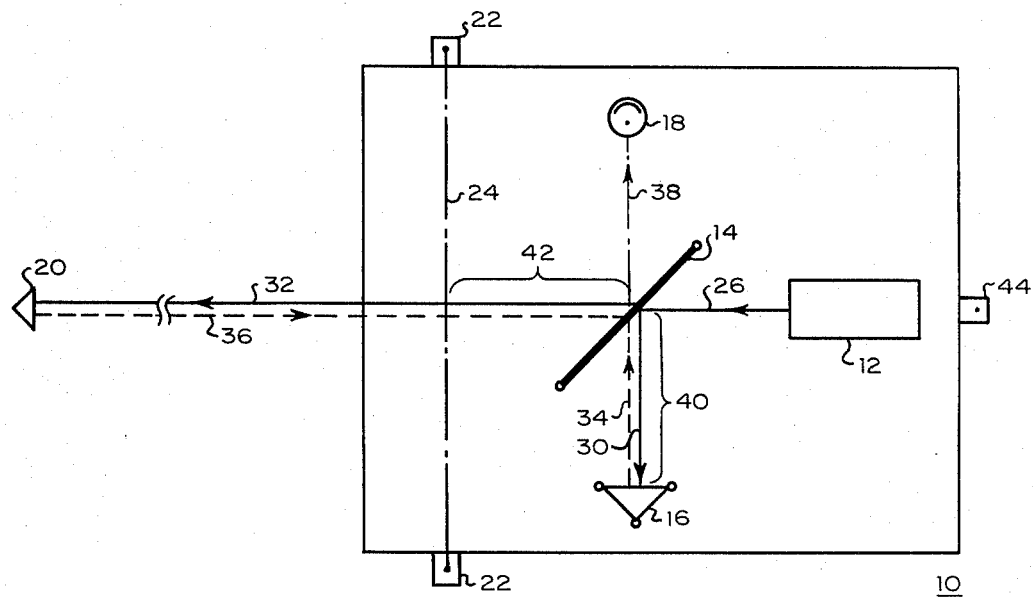
FIG. 1 shows a schematic representation of a laser interferometer with the incident and reflected light beams.

FIG. 1 shows a laser interferometer 10 with a laser 12 mounted in it. A beam splitter 14 is mounted in the light path 26 of laser 12 and allows a portion of the light to pass through as light beam 32 and reflects the rest as light beam 30 toward internal reflector 16. Light beam 32 is reflected from external reflector 20 as light beam 36, and light beam 30 reflects off internal reflector 16 as beam 34. Light beams 36 and 34 recombine at the beam splitter and become light beam 38 which is directed at photodetector 18. An interference pattern is created when the light beams recombine in accordance with well known principles of physics, and the light which reaches photodetector 18 will vary in intensity depending upon the relative distances light beams 32, 36 and 30, 34 travel. Clamps 22 fasten interferometer 10 to external structures when it is in use. A reference line 24 is defined between clamps 22.

Figure 2:
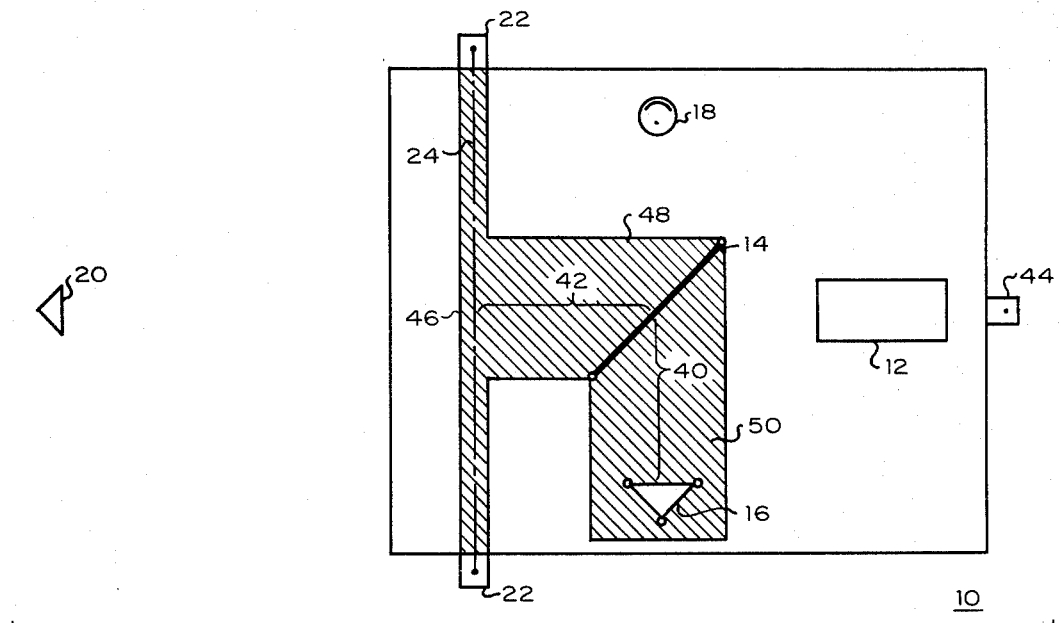
FIG. 2 shows a schematic representation of a laser interferometer including a schematic representation of the mounting structure for the internal reflector and beam splitter.

Referring to FIG. 2, beam splitter 14 and internal reflector 16 are held in a precise spatial relationship with the clamps 22, and thus reference line 24, by a mounting structure 46 to which elements 14 and 16 are mechanically fastened. The thermal coefficient of expansion of mounting structure portion 48 between reference line 24 and beam splitter 14, and portion 50 between beam splitter 14 and internal reflector 16 may be determined. The thermal coefficient of expansion of a piece of material along a particular direction is defined as the change in length per unit length per unit change in temperature. If, knowing the thermal coefficients of expansion for portion 48 and portion 50, one chooses the distance 42 between reference line 24 and beam splitter 14 and the distance 40 between beam splitter 14 and internal reflector 16 such that distance 42 and distance 40 change by the same amount for a change in temperature, there will be no change in the interference pattern as seen by photodetector 18. The interference pattern will only change if there is a relative change of length between light beams 32, 36 and 30, 34; therefore, if both change by the same amount, interferometer 10 will not be sensitive to changes in temperature. Since a third point of support is necessary for the instrument, point 44 is provided; it is free to move in a direction parallel with light beam 26, as the interferometer 10 expands and contracts with temperature changes.

I claim:
1. An interferometric distance measuring apparatus comprising:
    a source of coherent light;
    a light detector;
    beam splitting means for splitting the coherent light from the source into first and second light beams;
    internal reflecting means for reflecting the second light beam toward the light detector;
    clamping means for clamping the distance measuring apparatus in place; and
    mounting means for holding the beam splitting means and internal reflecting means in a precise spatial relationship with each other and with the clamping means, the mounting means having a first thermal coefficient of expansion for a first portion of the mounting means which is between the beam splitting means and the internal reflecting means and a second thermal coefficient of expansion for a second portion of the mounting means which is between the beam splitting means and the apparatus clamping means, the mathematical product of the length of the first portion of the mounting means and first thermal coefficient of expansion being made equal to the mathematical product of the length of the second portion of the mounting means and second thermal coefficient of expansion by the selection of the lengths of the first and second portions of the mounting means to compensate for measurement errors due to changes in apparatus temperature.

2. An interferometric distance measuring apparatus as in claim 1 wherein:
 the first and second light beams are essentially orthogonal;
 the clamping means has an axis defining a reference line; and
 the reference line is essentially orthogonal to the first light beam.

References Cited

UNITED STATES PATENTS

| | | | |
|---|---|---|---|
| 2,841,049 | 7/1958 | Scott | 356—106 |
| 3,459,467 | 8/1969 | Kantor | 356—112 |
| 3,205,774 | 9/1965 | Estes | 350—253 |

RONALD L. WIBERT, Primary Examiner

C. CLARK, Assistant Examiner